(12) United States Patent
Sankaran et al.

(10) Patent No.: US 12,030,768 B2
(45) Date of Patent: Jul. 9, 2024

(54) TOUCHLESS DISPENSING SYSTEM AND METHOD

(71) Applicant: BUNN-O-MATIC CORPORATION, Springfield, IL (US)

(72) Inventors: Prashanth Sankaran, Springfield, IL (US); Keith M. Ripperda, Springfield, IL (US)

(73) Assignee: Bunn-O-Matic Corporation, Springfield, IL (US)

( * ) Notice: Subject to any disclaimer, the term of this patent is extended or adjusted under 35 U.S.C. 154(b) by 0 days.

(21) Appl. No.: 17/508,387

(22) Filed: Oct. 22, 2021

(65) Prior Publication Data
US 2022/0041425 A1    Feb. 10, 2022

Related U.S. Application Data

(63) Continuation of application No. PCT/US2021/032988, filed on May 18, 2021.
(Continued)

(51) Int. Cl.
    *B67D 1/08*         (2006.01)
    *G05B 15/02*      (2006.01)
    (Continued)

(52) U.S. Cl.
    CPC ........... *B67D 1/0888* (2013.01); *G05B 15/02* (2013.01); *G06F 3/0482* (2013.01); *G06F 3/14* (2013.01);
    (Continued)

(58) Field of Classification Search
    CPC ..... B67D 1/0888; G05B 15/02; G06F 3/0482; G06F 3/14; G06K 7/10297;
    (Continued)

(56) References Cited

U.S. PATENT DOCUMENTS

| 5,350,082 A | 9/1994 | Kiriakides, Jr. et al. |
| 5,491,463 A | 2/1996 | Sargeant |

(Continued)

FOREIGN PATENT DOCUMENTS

| CN | 106264149 | 1/2017 |
| CN | 107067556 | 8/2017 |

(Continued)

OTHER PUBLICATIONS

Cafection, "Sophia Touchless Solutions in Action," accessed via the Internet at: https://www.youtube.com/watch?v=nt0zUIHaxel (May 20, 2020).

(Continued)

*Primary Examiner* — Matthew Mikels
(74) *Attorney, Agent, or Firm* — Barnes & Thornburg LLP

(57) ABSTRACT

A network-controlled dispensing device is provided. The dispensing device may include a display, a scannable device identifier (e.g., QR code, RFID tag, etc.) that uniquely identifies the dispensing device to a scanning device, and a network device to establish communications with a server based, at least in part, on the scannable device identifier. The dispenser includes a controller to control dispensing of a product based on one or more product selections received from the server. The controller generates a dispense code in response to receiving one or more product selections from the server and presents the dispense code on the display. If the code received from the server matches the dispense code, the controller dispenses a product based on the one or more product selections received from the server.

15 Claims, 5 Drawing Sheets

Related U.S. Application Data

(60) Provisional application No. 63/027,853, filed on May 20, 2020.

(51) Int. Cl.
*G06F 3/0482* (2013.01)
*G06F 3/14* (2006.01)
*G06K 7/10* (2006.01)
*G06K 7/14* (2006.01)

(52) U.S. Cl.
CPC ..... *G06K 7/10297* (2013.01); *G06K 7/10366* (2013.01); *G06K 7/1417* (2013.01)

(58) Field of Classification Search
CPC ............. G06K 7/10366; G06K 7/1417; G06Q 20/3223; G06Q 20/326; G06Q 20/18; G07F 9/001; G07F 13/065
See application file for complete search history.

(56) References Cited

U.S. PATENT DOCUMENTS

| | | | |
|---|---|---|---|
| 6,587,739 | B1 | 7/2003 | Abrams |
| 7,032,818 | B2 | 4/2006 | Thomas et al. |
| 7,578,415 | B2 | 8/2009 | Ziesel et al. |
| 7,866,509 | B2 | 1/2011 | Ziesel |
| 7,881,822 | B2 | 2/2011 | Thornton et al. |
| 8,771,774 | B2 | 7/2014 | Miller |
| 8,820,580 | B2 | 9/2014 | Ziesel |
| 9,253,264 | B2 | 2/2016 | Robinson et al. |
| 9,334,150 | B1 * | 5/2016 | Ost ..................... B67D 1/0888 |
| 9,394,154 | B2 | 7/2016 | Connerat et al. |
| 9,495,673 | B2 | 11/2016 | Cameron et al. |
| 9,713,399 | B2 | 2/2017 | Boone et al. |
| 9,646,314 | B2 | 5/2017 | Moore et al. |
| 9,701,530 | B2 | 7/2017 | Kline et al. |
| 9,721,060 | B2 | 8/2017 | Chung et al. |
| 9,764,935 | B2 | 9/2017 | Jersey et al. |
| 9,840,407 | B2 | 12/2017 | Difatta et al. |
| 9,883,377 | B2 | 1/2018 | Cheng |
| 9,910,502 | B2 | 3/2018 | Geurts et al. |
| 10,121,306 | B2 | 11/2018 | Peters et al. |
| 10,143,331 | B1 | 12/2018 | Heys et al. |
| 10,365,620 | B1 | 7/2019 | Raeber et al. |
| 10,453,461 | B1 | 10/2019 | Mutagi et al. |
| 10,579,958 | B2 | 3/2020 | Gray et al. |
| 10,602,334 | B2 | 3/2020 | Kim |
| 10,631,558 | B2 | 4/2020 | White et al. |
| 11,059,713 | B1 | 7/2021 | Connor |
| 11,084,703 | B2 | 8/2021 | Peters et al. |
| 11,087,376 | B2 | 8/2021 | Cuppari et al. |
| 2002/0011923 | A1 | 1/2002 | Cunningham |
| 2003/0079613 | A1 | 5/2003 | Williamson |
| 2003/0084047 | A1 | 5/2003 | Williamson |
| 2006/0293956 | A1 | 12/2006 | Walker et al. |
| 2007/0086514 | A1 | 4/2007 | Lawrence |
| 2010/0326562 | A1 | 12/2010 | Sheehy et al. |
| 2011/0052766 | A1 | 3/2011 | Knepler |
| 2013/0195088 | A1 | 8/2013 | Ho |
| 2013/0275957 | A1 | 10/2013 | Villar et al. |
| 2014/0100942 | A1 * | 4/2014 | Konevic ................. H04L 67/34 705/14.37 |
| 2014/0263415 | A1 | 9/2014 | San Miguel et al. |
| 2014/0267094 | A1 | 9/2014 | Hwang et al. |
| 2015/0039776 | A1 | 2/2015 | Jarnagin, III |
| 2015/0082243 | A1 | 3/2015 | Taylor et al. |
| 2015/0178721 | A1 | 6/2015 | Pandiarajan |
| 2015/0297022 | A1 | 10/2015 | Guard |
| 2016/0045064 | A1 | 2/2016 | Lopez |
| 2016/0165660 | A1 | 6/2016 | Delamare |
| 2016/0321447 | A1 | 11/2016 | Lancioni |
| 2016/0325980 | A1 | 11/2016 | Sawhney et al. |
| 2017/0046903 | A1 | 2/2017 | Knepler |
| 2017/0081163 | A1 | 3/2017 | Gatipon et al. |
| 2017/0099981 | A1 | 4/2017 | Haidar |
| 2017/0331899 | A1 | 11/2017 | Binder |
| 2018/0138945 | A1 | 5/2018 | Kearney |
| 2018/0168385 | A1 | 6/2018 | Boone |
| 2018/0211235 | A1 | 7/2018 | Geigel et al. |
| 2018/0288594 | A1 | 10/2018 | Kim |
| 2019/0108709 | A1 | 4/2019 | Yamazaki et al. |
| 2019/0117011 | A1 | 4/2019 | Magatti |
| 2019/0172297 | A1 | 6/2019 | Schwarber et al. |
| 2019/0207650 | A1 | 7/2019 | Kearney |
| 2019/0259077 | A1 | 8/2019 | Cuppari et al. |
| 2019/0279181 | A1 | 9/2019 | Kelly et al. |
| 2019/0308866 | A1 | 10/2019 | Sawhney et al. |
| 2020/0031656 | A1 * | 1/2020 | Rudick ................ G06F 3/0486 |
| 2020/0129004 | A1 | 4/2020 | Hanes |
| 2020/0327766 | A1 * | 10/2020 | Wilkinson .......... G06Q 20/322 |
| 2020/0375388 | A1 | 12/2020 | MacFarlane |
| 2021/0181892 | A1 | 6/2021 | Rudick |
| 2021/0371266 | A1 | 12/2021 | Connor |

FOREIGN PATENT DOCUMENTS

| | | |
|---|---|---|
| CN | 108392076 | 8/2018 |
| EP | 3505021 | 7/2019 |
| EP | 3616575 | 3/2020 |
| IN | 201931033033 | 9/2019 |
| JP | 6186488 | 8/2017 |
| WO | 2015/167846 | 11/2015 |
| WO | 2017/146991 | 8/2017 |
| WO | 2020/132457 | 6/2020 |
| WO | WO 2021/247421 | 12/2021 |

OTHER PUBLICATIONS

Carimali, "Touchless Solutions," accessed via the Internet at: https://www.carimali.com/en/press-and-media/video/touchless-solutions/ (Jun. 24, 2020).

Coca-Cola Company, "Coca-Cola rolls out contactless Freestyle beverage dispenser," accessed via the Internet at: https://www.vendingtimes.com/news/coca-cola-co-rolls-out-contactless-freestyle-beverage-dispenser/ (Jul. 13, 2020).

De Jong Duke, "ConnectMe—Keeps you Informed," accessed via the Internet at: https://www.dejongduke.us/products/connectme-option/ (believed to be publically available by May 18, 2021).

Elkay Manufacturing Company Corp., "Smartwell® Touchless Beverage Dispenser," accessed via the Internet at: https://www.vendingmarketwatch.com/coffee-service/water-equipment-coolers-filters-accessories-etc/product/21152498/elkay-smartwell-touchless-beverager-dispenser (Aug. 31, 2020).

Jura Elektroapparate AG, "J.O.E.® brings state-of-the-art operation to your smartphone," accessed via the Internet at: https://us.jura.com/en/homeproducts/accessories/JOE?utm_source=redir&utm_medium=US&utm_content=US-en&utm_campaign=joe#&gid=undefined&pid=2 (believed to be publically available by May 18, 2021).

Lavazza, "Flavia Creation 600," accessed via the Internet at: https://www.vendingtimes.com/news/lavazza-to-launch-hygienic-brewer/ (Jul. 17, 2020).

Nespresso Professional, "New Features for Safer Coffee Moments," accessed via the Internet at: https://www.nespresso.com/pro/de/en/momento-touchless (believed to be publically available by May 18, 2021).

Newco Enterprises, "Newco Touchless Solutions," accessed via the Internet at: https://www.newcocoffee.com/newco-touchless-solutions/ (Jul. 13, 2020).

Schaerer AG, "Touchless Coffee Schaerer Soul QR Demo," accessed via the Internet at: httgs://www.xoutube.com/watch?v=4w1mhGYjVPY (Nov. 3, 2020).

Sestra Systems, "Touchless Smart Dispensing," accessed via the Internet at: https://www.sestrasystems.com/touchless/ (believed to be publically available by May 18, 2021).

Thermoplan AG, "Touchless Coffee Enjoyment," Brochure (Jul. 15, 2021).

(56) References Cited

OTHER PUBLICATIONS

Bevi, "Bevi Offers New Touchless Beverage Dispensing Feature," Retrieved from the Internet at: https://www.vendingmarketwatch.com/beverage/news/21142193/bevi-offers-new-touchless-beverage-dispensing-feature, (Jun. 15, 2020).

Bunn, Bunn Introduces VirtualTouch, Retrieved from the Internet at: https://www.vendingmarketwatch.com/coffee-service/news/21148461/bunn-introduces-virtualtouch (Jul. 31, 2020).

Cafection, "Sophia Touchless Solutions in Action," Retrieved from the Internet at: https://www.youtube.com/watch?v=nt0zUIHaxel&feature=emb_title, (Youtube Video uploaded May 20, 2020).

Search Report & Written Opinion issued in PCT/US2021/032988 (2021).

Bunn-O-Matic Corporation, "ADA Standards for Accessible Design," Brochure (Mar. 15, 2012).

\* cited by examiner

TOUCHLESS DISPENSING SYSTEM AND METHOD

RELATED APPLICATIONS

This is a continuation application of International Application No. PCT/US2021/032988, filed May 18, 2021, for a "Touchless Dispensing System and Method, which claims the benefit of U.S. Provisional Application Ser. No. 63/027,853, filed May 20, 2020, for a "Touchless Dispensing System and Method," which are hereby incorporated by reference in their entireties.

TECHNICAL FIELD

The present disclosure relates to dispensing devices; in particular, this disclosure relates to a dispensing device from which a user may make selection(s) and/or initiate dispensing without touching any exterior surfaces of the device.

BACKGROUND

The present disclosure relates to dispensing devices, such as devices for dispensing vending products, coffee, tea, juice, soft drinks, and the like. With existing devices for dispensing beverages, for example, the user typically makes selections and initiates dispensing of the beverage by touching exterior surfaces of the device, such as a touchscreen, buttons, dials, etc. For example, the user may select a recipe for a coffee or tea beverage, and initiate brewing by touching various portions of the brewer's touchscreen.

It would be preferable to not have multiple users touching the external surfaces of the device. For example, a user that may not have washed their hands could potentially contaminate surfaces of the device when that the user touches the controls to make selections and start dispensing the product. These contaminated areas could potentially result in the user sharing germs with a subsequent user that touches the same surfaces to control the device.

There are existing devices for dispensing products that can be operated in a touchless manner. For example, some existing devices can be controlled wirelessly using mobile devices. However, establishing wireless communications between such a dispenser and a mobile device can be time consuming, unreliable, require downloading of special phone-apps, and err-prone. Even when selections can be made on the wireless device, in many cases the dispenser requires the user to touch a button to initiate dispensing of the beverage, which could potentially transfer contaminants. Therefore, there is a need for a device for dispensing products that can be controlled in a touchless manner with a mobile device without the hassle of establishing wireless communications between the dispensing device and the mobile device.

SUMMARY

According to one aspect, this disclosure provides a network-controlled dispensing device. The dispensing device includes a display, a scannable device identifier that uniquely identifies the dispensing device to a scanning device, and a network device to establish communications with a server based, at least in part, on the scannable device identifier. There is a controller to control dispensing of a product based on one or more product selections received from the server. The controller generates a dispense code in response to receiving one or more product selections from the server and presents the dispense code on the display. Also, the controller dispenses a product based on the one or more product selections received from the server in response to receiving a code from the server that matches the dispense code.

According to another aspect, this disclosure provides a server to establish a cloud-based pairing between a mobile device and a network-controlled dispensing device, the server comprising: one or more processors and a memory to store one or more instructions that, in response to being executed, cause the server to: receive a request to control a dispensing device, wherein the request includes an identifier that uniquely identifies the dispensing device; determine one or more active product selection options corresponding to the dispensing device as a function of the identifier that uniquely identifies the dispensing device; prompt for a selection of one or more product options from the one or more active product selection options determined to correspond with the dispenser device identified in the request; and send a message including the selections of the one or more product options to the dispensing device identified in the request.

According to a further aspect, this disclosure provides a method of controlling a dispensing device in a touchless manner. The method includes the step of presenting a QR code on a display of a dispensing device. A mobile device is used to scan the QR code by a mobile device, wherein the dispense code encodes an identifier that uniquely identifies the dispensing device. The method includes the step of sending a message by the mobile device to a remote server in response to scanning the QR code that includes the identifier that uniquely identifies the device for dispensing a beverage. The remote server determines one or more active product selection options for the device as a function of the identifier. A user interface is presented on the mobile device that prompts for a selection of one or more product options based on active product selection options specific to the device identified by the identifier in the message. The selection of one or more product options are received from the user interface and sent to the dispensing device identified in the message. In response, the dispensing device generates a dispensing code, which is presented on the dispensing device's display. A code entered via the mobile device is received from the server to initiate dispensing by the dispensing device. The dispensing device determines whether the code entered via the mobile device matches the dispense code. If it matches, the dispensing device dispenses the product. If not, an error message is presented on the display of the dispensing device.

DETAILED DESCRIPTION OF THE DRAWINGS

Figure 1:
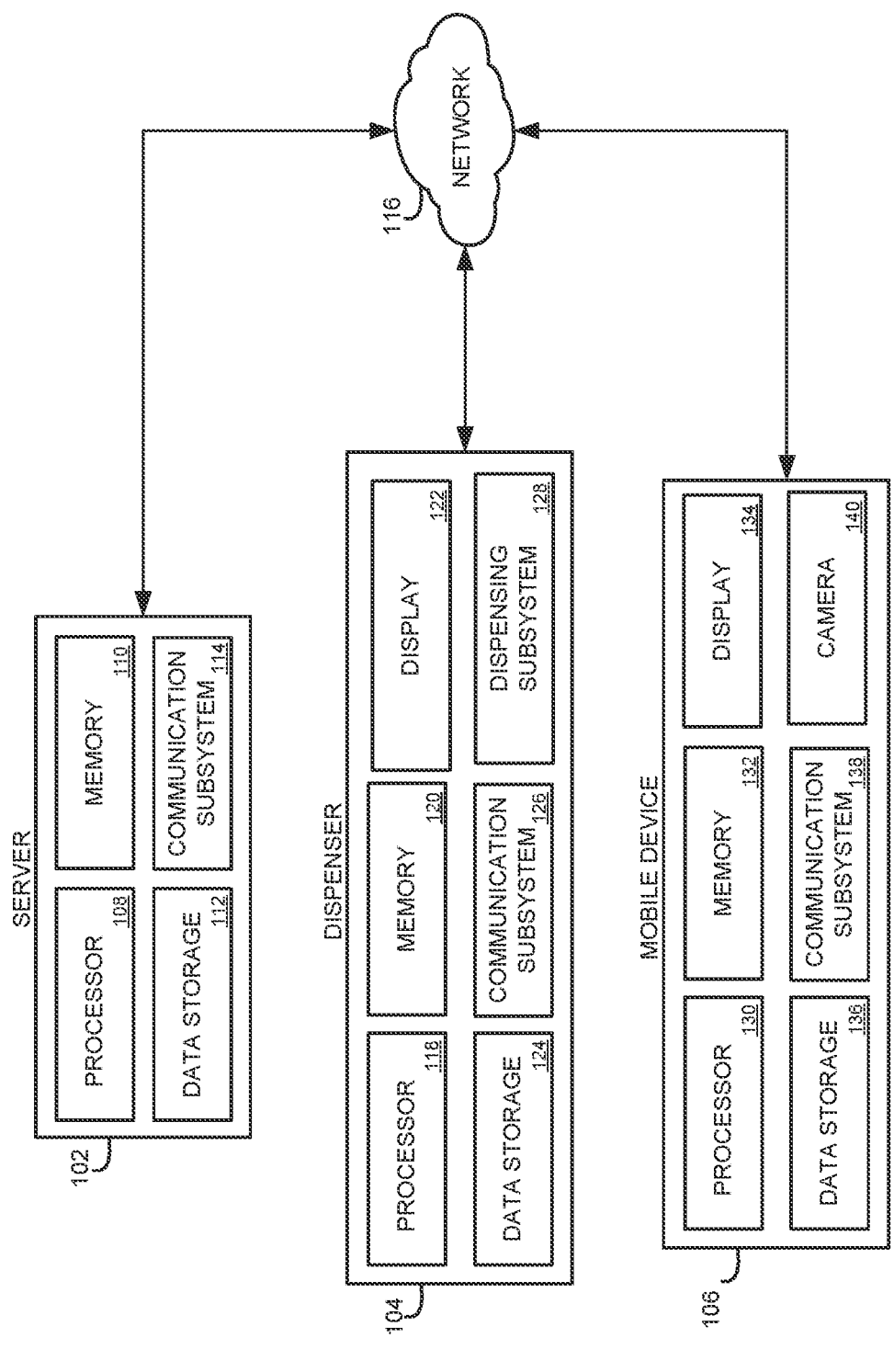
FIG. 1 is a simplified block diagram of at least one embodiment of a touchless system for dispensing a product.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, a system 100 for facilitating touchless dispensing of any type of product, and specifically for convenience in discussing the present invention we will refer to dispensing of a beverage, which in the embodiment shown, includes a server 102, a dispenser 104, and a mobile device 106. The system 100 allows the user to control dispensing of a beverage without touching any external surface of the dispenser 104, which could potentially be contaminated. Thus, instead of requiring the user to touch a touchscreen and/or buttons on the dispenser 104 for selection and/or dispensing of a beverage, the system 100 allows a user to select a beverage (and/or customize the beverage), and initiate dispensing using a mobile device 106, their own mobile device, without touching the dispenser 104. In some embodiments, another technical advantage of the system 100 is cloud-based pairing of the dispenser 104 with the mobile device 106 through the server 102 so local wireless communications between the mobile device 106 and the dispenser 104 do not need to be established. Instead, in some embodiments, cloud-based pairing between the dispenser 104 and the mobile device 106 can be established merely by scanning a QR code identifying the dispenser 104, which allows the mobile device 106 to control dispensing of the specific dispenser 104 with which it has been paired. The term "dispenser" is broadly intended to mean any device that could be used to dispense any type of product, including but not limited to vending products, brewed beverages (e.g., tea, coffee, etc.), water, liquor, beer, milk, juice, soft drinks, soup, salad dressing and/or or other products.

The server 102 may be embodied as any type of computation or computer device capable of performing the functions described herein. As shown in FIG. 1, the server 102 includes a processor 108, a memory 110, a data storage device 112, and a communication subsystem 114. Of course, the server 102 may include other or additional components, such as those commonly found on servers, in other embodiments. Additionally, in some embodiments, one or more of the illustrative components may be incorporated in, or otherwise form a portion of, another component. For example, the memory 110, or portions thereof, may be incorporated in the processor 108 in some embodiments. The processor 108 may be embodied as any type of processor capable of performing the functions described herein, such as a single or multi-core processor, microcontroller, or other processor or processing/controlling circuit. The memory 110 may be embodied as any type of volatile or non-volatile memory or data storage capable of performing the functions described herein. In operation, the memory 110 may store various data and software used during operation of the server 102 such as applications, programs, libraries, and/or drivers. The memory 110 is communicatively coupled to the processor 108. Similarly, the data storage device 112 may be embodied as any type of device or devices configured for short-term or long-term storage of data such as, for example, memory devices and circuits, memory cards, hard disk drives, solid-state drives, non-volatile flash memory, or other data storage devices. The communication subsystem 114, which may be embodied as any communication circuit, device, or collection thereof, capable of enabling communications between the server 102 and other remote devices over the network 116, such as dispenser 104 and mobile device 106. The communication subsystem 114 may be configured to use any one or more communication technology (e.g., wired or wireless communications) and associated protocols (e.g., Ethernet, Wi-Fi®, WiMAX, 3G, 4G LTE, etc.) to effect such communication.

The dispenser 104 is configured to dispense a beverage in an electronically controlled manner. As shown in FIG. 1, the dispenser 104 includes a processor 118, a memory 120, a display 122, a data storage device 124, a communication subsystem 126, and a dispensing subsystem 128. Of course, the dispenser 104 may include other or additional components, such as those commonly found on beverage dispensers, in other embodiments. The processor 118 may be embodied as any type of processor capable of performing the functions described herein, such as a single or multi-core processor, microcontroller, or other processor or processing/controlling circuit. The memory 120 may be embodied as any type of volatile or non-volatile memory or data storage capable of performing the functions described herein. In operation, the memory 120 may store various data and software used during operation of the dispenser 104 such as applications, programs, libraries, and/or drivers. The memory 120 is communicatively coupled to the processor 118. The display 122 may be any type of display capable of performing the functions described herein, such as a touch-screen, LED, OLED, LCD, or other type of display. Similarly, the data storage device 124 may be embodied as any type of device or devices configured for short-term or long-term storage of data such as, for example, memory devices and circuits, memory cards, hard disk drives, solid-state drives, non-volatile flash memory, or other data storage devices. The communication subsystem 126, which may be embodied as any communication circuit, device, or collection thereof, capable of enabling communications between the dispenser 104 and other remote devices over the network 116, such as server 102. The communication subsystem 126 may be configured to use any one or more communication technology (e.g., wired or wireless communications) and associated protocols (e.g., Ethernet, Wi-Fi®, WiMAX, 3G, 4G LTE, etc.) to effect such communication. The dispensing subsystem 128 is configured to electronically control at least dispensing of the beverage.

The mobile device 106 may be embodied as any type of computation or computer device capable of performing the functions described herein, such as a smart phone, tablet, notebook computer, etc. As shown in FIG. 1, the mobile device includes a processor 130, a memory 132, a display 134, a data storage 136, a communication subsystem 138, and a camera 140. Of course, the mobile device 106 may include other or additional components, such as those commonly found on mobile devices, in other embodiments. The processor 130 may be embodied as any type of processor capable of performing the functions described herein, such as a single or multi-core processor, microcontroller, or other processor or processing/controlling circuit. The memory 132 may be embodied as any type of volatile or non-volatile memory or data storage capable of performing the functions described herein. In operation, the memory 132 may store various data and software used during operation of the mobile device 106 such as applications, programs, libraries, and/or drivers. The memory 132 is communicatively coupled to the processor 130. The display 134 may be any type of display capable of performing the functions described herein, such as a touchscreen, LED, OLED, LCD, or other type of display. Similarly, the data storage device 136 may be embodied as any type of device or devices configured for short-term or long-term storage of data such as, for example, memory devices and circuits, memory cards, hard disk drives, solid-state drives, non-volatile flash memory, or other data storage devices. The communication subsystem 138, which may be embodied as any communication circuit, device, or collection thereof, capable of enabling communications between the mobile device 106 and other remote devices over the network 116, such as the server 102. The communication subsystem 138 may be configured to use any one or more communication technology (e.g., wired or wireless communications) and associated protocols (e.g., Ethernet, WiMAX, 3G, 4G LTE, etc.) to effect such communication. The camera 140 may be integrated into the mobile device and could be configured to scan a QR code.

Figure 2:
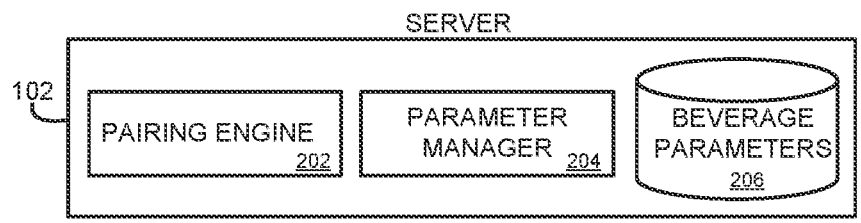
FIG. 2 is a simplified block diagram of various environments of the server of FIG. 1.

Referring now to FIG. 2, in an illustrative embodiment, the server 102 establishes an environment 200 during operation to facilitate cloud-based pairing between a dispenser 104 and a mobile device 106 so that the mobile device 106 can facilitate beverage selection and control dispensing of beverages through the dispenser 104 without touching any external surface of the dispenser 104. The illustrative environment 200 includes a pairing engine 202, a parameter manager 204, and a beverage parameters data store 206. As shown, the various components of the environment 200 may be embodied as hardware, firmware, software, or a combination thereof. As such, in some embodiments, one or more of the components of the environment 202 may be embodied as circuitry or collection of electrical devices (e.g., pairing engine circuitry, parameter manager circuitry, and beverage parameter data store circuitry). It should be appreciated that, in such embodiments, one or more of the pairing engine 202, parameter manager 204, and/or beverage parameters data store 206 may form a portion of the processor 108, the memory 110, and/or other components of the server 102. Additionally, in some embodiments, one or more of the illustrative components may form a portion of another component and/or one or more of the illustrative components may be independent of one another.

The pairing engine 202 is configured to receive a request from a mobile device 106 over the network 116 to control a dispenser 104. Typically, the mobile device 106 sends this request in response to reading a QR code on the display of the dispenser 104. For example, the QR code could embed the serial number or other identifier of the dispenser 104, and this identifier could be included in the request from the mobile device 106 via scanning the QR code. By way of example, the QR code could embed a URL to a web page specific to the dispenser 104. The pairing engine 202 is configured to parse the request and return an interface, which could be embodied as a web page, from which the user of the mobile device 106 can make beverage selections and control dispensing of the beverage from the selected dispenser 104. Typically, the interface is customized based on availability of active recipes (or other parameters) for the dispenser 104. For example, the pairing engine 202 could retrieve available recipes (and/or other parameters) for the dispenser 104 identified in the request from the parameter manager 204. This allows an interface customized specific to the specific dispenser 104 for which the mobile device 106 requests pairing.

The parameter manager 204 is configured to return available recipes (or other parameters) for an identified dispenser 104. For example, the beverage parameters data store 206 may include data indicating what recipes are active (and/or other parameters) for a plurality of dispensers. The term "recipe" is broadly intended to include any instructions and parameters needed to make a beverage. The data in the beverage parameters data store 206 could be maintained on a periodic, such as a daily or hourly basis, based on periodic reports received from the plurality of dispensers via the network 116, which provides an up-to-date list of active recipes (and/or other parameters) for the plurality of dispensers. The parameter manager 204 is able to determine available recipes (and/or other parameters) as a function of an identifier of a dispenser, and pass this information to the pairing engine 202 so the interface provided to the mobile device 106 has active recipes (and/or other parameters) specific to the requested dispenser 104.

Figure 3:
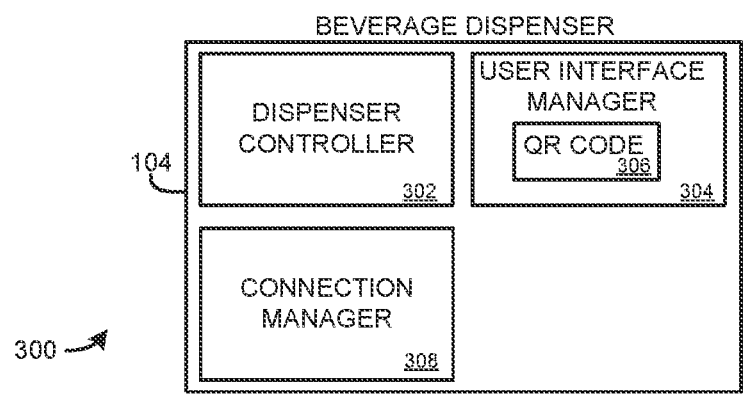
FIG. 3 is a simplified block diagram of various environments of the dispenser of FIG. 1.

Referring now to FIG. 3, in an illustrative embodiment, the dispenser 104 establishes an environment 300 during operation to facilitate touchless control of the dispenser 104 by the mobile device 106 so that the mobile device 106 can facilitate beverage selection and control at least dispensing without touching any external surface of the dispenser 104.

The illustrative environment 300 includes a dispenser controller 302, a user interface manager 304, which in some cases generates a QR code 306 identifying the dispenser 104, and a connection manager 308. As shown, the various components of the environment 300 may be embodied as hardware, firmware, software, or a combination thereof. As such, in some embodiments, one or more of the components of the environment 300 may be embodied as circuitry or collection of electrical devices (e.g., dispenser controller circuitry, user interface manager circuitry, and connection manager circuitry). It should be appreciated that, in such embodiments, one or more of the dispenser controller 302, user interface manager 304, and a connection manager 308 may form a portion of the processor 118, the memory 120, and/or other components of the dispenser 104. Additionally, in some embodiments, one or more of the illustrative components may form a portion of another component and/or one or more of the illustrative components may be independent of one another.

The dispenser controller 302 is configured to control dispensing of beverages from the dispenser 104. For example, the dispenser controller 302 could be configured to control the dispensing subsystem 128 to programmatically control the dispensing of a beverage based on a recipe/selection(s) received through a message from the server 102 based on selections from the mobile device 106. As discussed herein, in some embodiments, the dispenser controller 302 is configured to generate a dispense code, and will wait to dispense the selected beverage until receiving a message from the server 102 with a dispense code (entered by the mobile device 106 and communicated to the server 102) that matches the dispense code generated by the dispenser controller 302. For example, the dispense code could be a random or pseudorandom alphanumeric sequence. Upon receiving a message from the server 102 with a matching dispense code, the dispenser controller 302 is configured to initiate dispensing of the beverage.

The user interface manager 304 is configured to present a user interface on the display 122. For example, as explained herein, the user interface manager 304, in addition to other possible interface elements, may present a QR code on the display 122, which can be scanned by the mobile device 106 to control selection/dispensing of the dispenser 104 in a touchless manner. In some embodiments, the QR code could be substantially continuously displayed on the display so a user may scan the QR code at any time, depending on the circumstances, a triggering event could cause the dispenser 104 to enter a touchless mode in which the QR code is displayed. For example, a touchless mode could be configured onboard the configuration controls of the dispenser 104, or remotely configured by the server 102. In such embodiments, the dispenser 104 could switch between a touch control and a touchless control. Although a QR code is described as a way to identify the dispenser 104 in the request to the server 102 for purpose of example, other types of device identifiers, such as a RFID tag embedded with the dispenser, could be used to request control by the mobile device. The user interface manager 304 may also be configured to present the dispense code generated by the dispenser controller 302, which can be entered via the mobile device 106 to initiate dispensing the selected beverage.

The connection manager 308 is configured to establish a connection with the server 102. In some embodiments, the connection manager 308 is configured to periodically report availability of recipes (or other beverage options) for the dispenser to the server 102, which may store such availability in the beverage parameters data store 206 based on an identifier of the dispenser 104.

Figure 4:
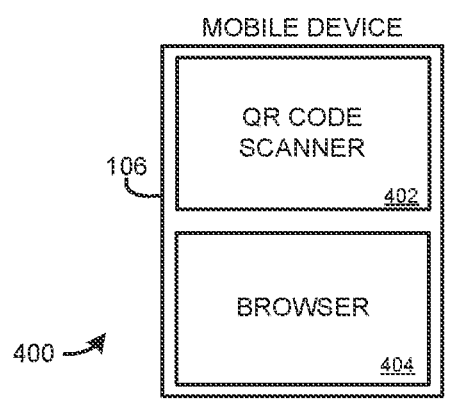
FIG. 4 is a simplified block diagram of various environments of the mobile device of FIG. 1.

Referring now to FIG. 4, in an illustrative embodiment, the mobile device 106 establishes an environment 400 during operation to facilitate pairing of the mobile device 106 and the dispenser 104 to allow touchless control by the mobile device 106. The illustrative environment 400 includes a QR code scanner 402 and a browser 404. As shown, the various components of the environment 400 may be embodied as hardware, firmware, software, or a combination thereof. In some embodiments, the QR code scanner 402 is configured to scan the QR code on the display 122 of the dispenser 104, such as using the mobile device's camera 140. As such, in some embodiments, one or more of the components of the environment 400 may be embodied as circuitry or collection of electrical devices (e.g., QR code scanner circuitry and browser circuitry). It should be appreciated that, in such embodiments, one or more of the QR code scanner and browser may form a portion of the processor 130, the memory 132, and/or other components of the mobile device 106. Additionally, in some embodiments, one or more of the illustrative components may form a portion of another component and/or one or more of the illustrative components may be independent of one another.

In the embodiment shown, the QR code scanner 402 is configured to scan a QR code on the display 122 of the dispenser 104 and direct the browser 404 to a URL with a web page specific to the dispenser 104. The browser 404 is configured to navigate the webpage and present the interface on that webpage to the user. For example, the browser 404 could be embodied as the Safari™ browser by Apple Corp. of Cupertino, California. In some embodiments, the interface could be presented on an app of the mobile device 106 instead of using a browser 404. The user may interact with the interface on the webpage to make a beverage selection (or customize the beverage). Upon making the selections, the interface on the web page may include a confirmation interface element, which sends the selections to the server 102. As discussed herein, the server 102 then sends the selections to the dispenser 104, which generates a dispense code that is displayed on the dispenser's screen. Upon making selections, the browser 404 presents an interface on the webpage from which the user may enter the dispense code via the mobile device 106. Upon entering the dispense code on the mobile device 106, the browser 404 sends the dispense code entered on the mobile device 106 to the server 102, which sends a message to the dispenser 104. In some embodiments, the server 102 and/or mobile device 106 may include a payment processing system for processing payment information prior to sending the dispense code. For example, one or more of the beverage selections may be associated with a price and the server 102 may include accounts with pre-existing credit card and/or debit card information associated with users of mobile devices 106 that could be applied for payment prior to sending a dispense code. This allows the dispenser 104 to charge for beverages without needing a local payment mechanism, such as a credit card terminal. For example, the mobile payment processing may guide a user of a mobile device through collection of payment information, such as entering credit card and/or debit card information to pay for the beverage selections. Once the payment is processed, if necessary, and the dispense code is sent, a comparison is made to verify the dispense code entered on the mobile device 106 matches the dispense code generated by the dispenser 104. If so, the dispenser 104 dispenses the beverage based on the selections made by the user on the mobile device 106.

Figure 5:
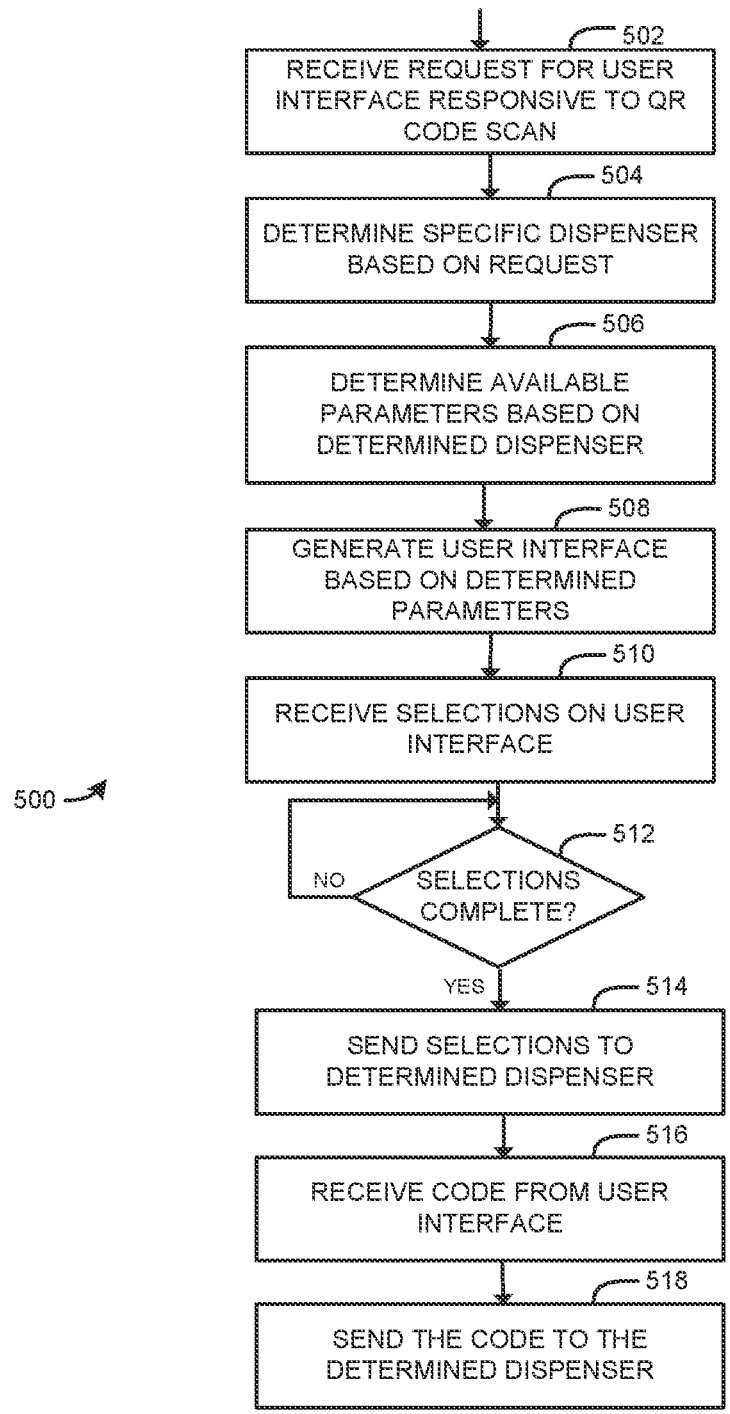
FIG. 5 is a simplified flow diagram of at least one embodiment of a method for facilitating beverage parameter selection and dispensing control of the server of FIG. 1.

Referring now to FIG. 5, in use, the server 102 may execute a method 500 for facilitating touchless control of the dispenser 104 by the mobile device 106. The method 500 begins in block 502, in which the server 102 receives a request for a user interface in response to the mobile device 106 scanning a QR code on the display 122 of the dispenser 104. For example, the server 102 may receive a request for a URL that identifies the dispenser 104 for which the mobile device 106 would like to control. The method advances to block 504 in which the server 102 determines the dispenser 104 identified in the message received from the mobile device 106. For example, the dispenser 104 could be identified by serial number or other identifier in the message from the mobile device 106. The server 102 then determines the active recipes available (and/or other parameters) for the identified dispenser based on data in the beverage parameters data store 206 (block 506) and generates a webpage (or other interface) that is customized based on the available recipes for the identified dispenser found in the beverage parameters data store 206 (block 508), which is sent to the browser 404 on the mobile device 106. The method then advances to block 510 in which selections from the user interface 510 is received from the mobile device 106. As discussed herein, the interface may include an element that can be selected by the user to indicate that selections have been completed (block 512), which sends the selections to the server 102. The method 500 then advances to block 514 in which the server 102 sends the selections to the identified dispenser 104. Next, the server 102 receives a code sequence entered on the user interface of the mobile device 106 (block 516) and sends the received code to the identified dispenser (block 518).

Figure 6:
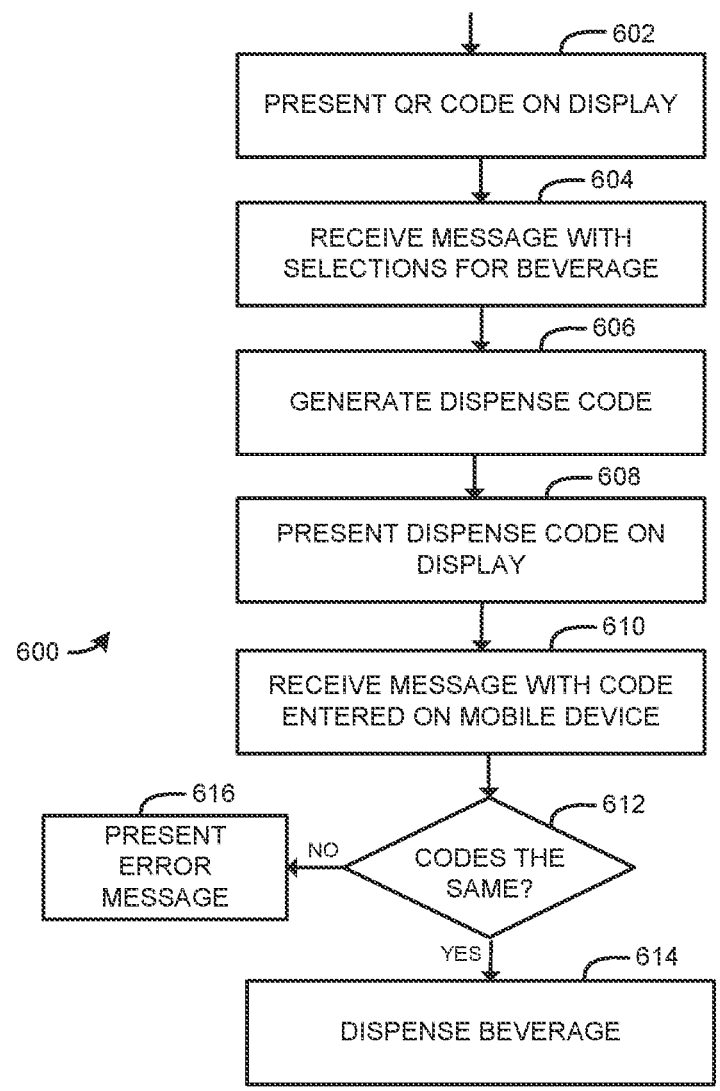
FIG. 6 is a simplified flow diagram of at least one embodiment of a method for facilitating touchless selection and dispensing of a beverage via the dispenser.

Referring now to FIG. 6, in use, the dispenser 104 may execute a method 600 for touchless control by a mobile device. In embodiment shown, the method 600 begins in block 602, in which the dispenser 104 presents a QR code on its display 122. As discussed herein, the QR code embeds an identifier of the dispenser 104. The method 600 advances to block 604 in which the dispenser 104 receives a message with beverage selections from the server 102. Next, the dispenser 104 generates a dispense code (block 606), which could be a random alphanumeric sequence. The method 600 advances to block 608 in which the dispense code is presented on the display 122 of the dispenser 104. Next, the method 600 advances to block 610 in which the dispenser 104 receives a code from the server 102, which was entered on the mobile device 106. A comparison is made of the dispense code generated by the dispenser 104 and the code entered into the mobile device 106 (block 612). If the codes match, the method 600 advances to block 614, and the dispenser 104 dispenses the beverage. If the codes do not match, the method advances to block 616 in which the dispenser present an error message, and does not dispense any beverage.

Figure 7:
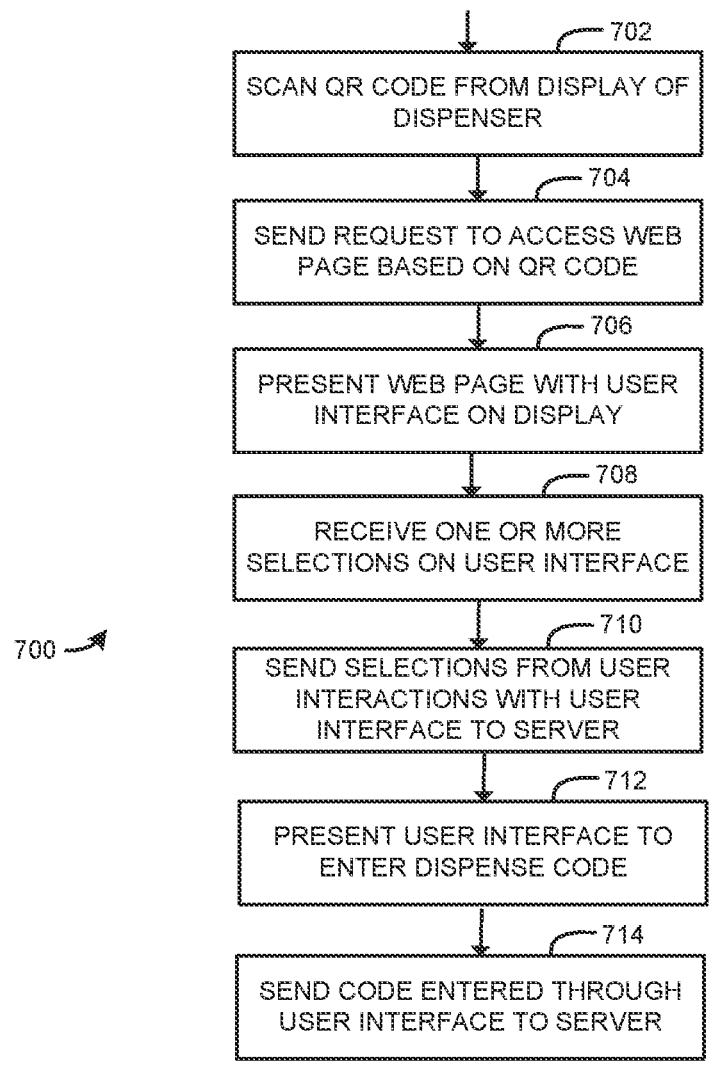
FIG. 7 is a simplified flow diagram of at least one embodiment of a method for selecting and initiating dispensing of a beverage via the mobile device of FIG. 1.

Referring now to FIG. 7, in use, the mobile device may execute a method 700 for touchless control of the dispenser 104. The method 700 begins in block 702, in which the user uses the mobile device 106 to scan the QR code on the display 122 of the dispenser 104, which embeds an identifier of dispenser. This action directs the mobile device's browser 404 to a URL corresponding to the QR code, which sends a request to the server 102 to access the web page based on the QR code (block 704). The browser then presents the web page with the user interface on the mobile device's display 134 (block 706). The method 700 then advances to block 708 in which one or more selections are received from the user interface. These selections on the user interface are sent from the mobile device 106 to the server 102 (block 710). Upon receiving these selections, the server 102 sends the selections to the dispenser 104, which then presents a dispense code on the display 122. The user then types this dispense code into the mobile device 106 via the user interface on the web page (block 712). This code entered into the mobile device 106 is sent to the server 102 (block 714), which then sends the code to the dispenser 104 for verification. As discussed herein, if the dispenser 104 verifies the code entered into the mobile device 106 matches the dispense code generated by the dispenser 104, the beverage is dispensed.

Examples

Illustrative examples of the technologies disclosed herein are provided below. An embodiment of the technologies may include any one or more, and any combination of, the examples described below.

Example 1 includes a network-controlled dispensing device. The dispensing device includes a display, a scannable device identifier that uniquely identifies the dispensing device to a scanning device, and a network device to establish communications with a server based, at least in part, on the scannable device identifier. There is a controller to control dispensing of a product based on one or more product selections received from the server. The controller generates a dispense code in response to receiving one or more product selections from the server and presents the dispense code on the display. Also, the controller dispenses a product based on the one or more product selections received from the server in response to receiving a code from the server that matches the dispense code.

Example 2 includes the subject matter of Example 1, and wherein: the scannable device identifier encodes a network address that includes a unique identifier that identifies the dispensing device.

Example 3 includes the subject matter of Examples 1-2, and wherein: the scannable device identifier comprises a QR code presented on the display of the dispensing device that is unique to the dispensing device.

Example 4 includes the subject matter of Examples 1-3, and wherein: the QR code encodes a URL that is unique to the dispensing device.

Example 5 includes the subject matter of Examples 1-4, and wherein: the QR code encodes a URL that is based, at least in part, on a serial number of the dispensing device.

Example 6 includes the subject matter of Examples 1-5, and wherein: the controller is configured to switch between a touchless mode in which the QR code is presented on the display of the dispensing device and a touch mode in which the QR is not presented on the display.

Example 7 includes the subject matter of Examples 1-6, and wherein: the scannable device identifier comprises a RFID tag that encodes a URL that is unique to the dispensing device.

Example 8 includes the subject matter of Examples 1-7, and wherein: the scannable device identifier comprises a NFC tag that encodes a URL that is unique to the dispensing device.

Example 9 includes the subject matter of Examples 1-8, and wherein: the dispense code is a random alphanumeric sequence.

Example 10 includes the subject matter of Examples 1-9, and wherein: the controller is to present an error message on the display of the dispensing device in response to the code received from the server not matching the dispense code.

Example 11 includes the subject matter of Examples 1-10, and wherein: the controller is configured to control brewing of a brewed beverage based on one or more beverage parameters received from the server, wherein the controller is configured to initiate brewing of the brewed beverage in response to receiving a code from the server that matches the dispense code.

Example 12 is a server to establish a cloud-based pairing between a mobile device and a network-controlled dispensing device, the server comprising: one or more processors and a memory to store one or more instructions that, in response to being executed, cause the server to: receive a request to control a dispensing device, wherein the request includes an identifier that uniquely identifies the dispensing device; determine one or more active product selection options corresponding to the dispensing device as a function of the identifier that uniquely identifies the dispensing device; prompt for a selection of one or more product options from the one or more active product selection options determined to correspond with the dispenser device identified in the request; and send a message including the selections of the one or more product options to the dispensing device identified in the request.

Example 13 includes the subject matter of Example 12, further comprising one or more instructions to generate an interface that prompts for a code and send a message to the dispensing device identified in the request with the code received via the interface.

Example 14 includes the subject matter of Examples 12-13, and wherein: the request to control the dispensing device is received from a mobile device in response to scanning a scannable device identifier.

Example 15 includes the subject matter of Examples 12-14, and wherein: the scannable device identifier comprises a QR code that encodes a URL that uniquely identifies the device.

Example 16 includes the subject matter of Examples 12-15, and wherein: to prompt for the selection of one or more product options comprises generating a customized interface for selecting one or more product options as a function of one or more active product selection options determined to correspond with the dispenser device identified in the request.

Example 17 includes the subject matter of Examples 12-16, and wherein: the customized interface limits user-selection to only active product selection options determined to correspond with the dispenser device identified in the request.

Example 18 includes the subject matter of Examples 12-17, and wherein: the customized interface comprises a web page specific to active product selection options determined to correspond with the dispenser device identified in the request.

Example 19 is a method of controlling a dispensing device in a touchless manner. The method includes the step of presenting a QR code on a display of a dispensing device. A mobile device is used to scan the QR code by a mobile device, wherein the QR code encodes an identifier that uniquely identifies the dispensing device. The method includes the step of sending a message by the mobile device to a remote server in response to scanning the QR code that includes the identifier that uniquely identifies the device for dispensing a beverage. The remote server determines one or more active product selection options for the device as a function of the identifier. A user interface is presented on the mobile device that prompts for a selection of one or more product options based on active product selection options specific to the device identified by the identifier in the message. The selection of one or more product options are received from the user interface and sent to the dispensing device identified in the message. In response, the dispensing device generates a dispensing code, which is presented on the dispensing device's display. A code entered via the mobile device is received from the server to initiate dispensing by the dispensing device. The dispensing device determines whether the code entered via the mobile device matches the dispense code. If it matches, the dispensing device dispenses the product. If not, an error message is presented on the display of the dispensing device.

Example 20 includes the subject matter of Example 19, and wherein: the QR code encodes a URL based, at least in part, on a serial number of the dispensing device.

The invention claimed is:

1. A network-controlled dispensing device comprising:
a display;
a scannable device identifier on the display that uniquely identifies the dispensing device to a scanning device;
a network device to establish communications with a server based, at least in part, on the scannable device identifier;
a controller to control dispensing of a product based on one or more product selections received from the server, wherein the controller is to generate a dispense code in response to receiving one or more product selections from the server and present the dispense code on the display, wherein the controller is to initiate dispensing a product based on the one or more product selections received from the server in response to receiving a code from the server that matches the dispense code presented on the display, wherein the scannable device identifier is different than the dispense code; and
wherein the dispense code is a random alphanumeric sequence.

2. The network-controlled dispensing device of claim 1, wherein the scannable device identifier encodes a network address that includes a unique identifier that identifies the dispensing device.

3. The network-controlled dispensing device of claim 1, wherein the scannable device identifier comprises a QR code presented on the display of the dispensing device that is unique to the dispensing device.

4. The network-controlled dispensing device of claim 3, wherein the QR code encodes a URL that is unique to the dispensing device.

5. The network-controlled dispensing device of claim 4, wherein the QR code encodes a URL that is based, at least in part, on a serial number of the dispensing device.

6. The network-controlled dispensing device of claim 3, wherein the controller is configured to switch between a touchless mode in which the QR code is presented on the display of the dispensing device and a touch mode in which the QR is not presented on the display.

7. The network-controlled dispensing device of claim 1, wherein the scannable device identifier comprises a RFID tag that encodes a URL that is unique to the dispensing device.

8. The network-controlled dispensing device of claim 1, wherein the scannable device identifier comprises a NFC tag that encodes a URL that is unique to the dispensing device.

9. The network-controlled dispensing device of claim 1, wherein the controller is to present an error message on the display of the dispensing device in response to the code received from the server not matching the dispense code.

10. The network-controlled dispensing device of claim 1, wherein the controller is configured to control brewing of a brewed beverage based on one or more beverage parameters received from the server, wherein the controller is configured to initiate brewing of the brewed beverage in response to receiving a code from the server that matches the dispense code.

11. A method of controlling a dispensing device in a touchless manner, the method comprising:
presenting a QR code on a display of a dispensing device;
scanning the QR code by a mobile device, wherein the QR code encodes a URL to a remote server and an identifier that uniquely identifies the dispensing device;
connecting the mobile device to the remote server at the URL in response to scanning the QR code;
determining, by the remote server, one or more active product selection options for the device as a function of the identifier;
receiving, on the mobile device, a web page with a user interface that prompts for a selection of one or more product options based on active product selection options specific to the device identified by the identifier in the message;
sending, by the mobile device, the selection of one or more product options from the user interface of the web page to the remote server;
sending, by the remote server, the selection of one or more product options to the dispensing device identified in the message;
generating, by the dispensing device, a dispense code, wherein the dispense code is a random alphanumeric sequence;
presenting the dispense code on the display of the dispensing device;
receiving, from the server, a code entered via the mobile device to initiate dispensing by the dispensing device;
determining whether the code entered via the mobile device matches the dispense code;
in response to determining the code entered via the mobile device matches the dispense code, dispensing the product; and
in response to determining the code entered via the mobile device does not match the dispense code, presenting an error message on the display of the dispensing device.

12. The method of claim 11, wherein the QR code encodes a URL based, at least in part, on a serial number of the dispensing device.

13. The method of claim 11, wherein the step of presenting the dispense code is in response to receiving payment data to pay for the one or more product options.

14. A network-controlled dispensing device comprising:
a display;
a scannable device identifier on the display that uniquely identifies the dispensing device to a scanning device;
a network device to establish communications with a server based, at least in part, on the scannable device identifier;
a controller to control dispensing of a product based on one or more product selections received from the server, wherein the controller is to generate a dispense code in response to receiving one or more product selections from the server and present the dispense code on the display, wherein the controller is to initiate dispensing a product based on the one or more product selections received from the server in response to receiving a code from the server that matches the dispense code presented on the display; and
wherein the controller is configured to control brewing of a brewed beverage based on one or more beverage parameters received from the server, wherein the controller is configured to initiate brewing of the brewed beverage in response to receiving a code from the server that matches the dispense code.

15. A network-controlled dispensing device comprising:
a display;
a scannable device identifier on the display that uniquely identifies the dispensing device to a scanning device;
a network device to establish communications with a server based, at least in part, on the scannable device identifier;
a controller to control dispensing of a product based on one or more product selections received from the server, wherein the controller is to generate a dispense code in response to receiving one or more product selections from the server and present the dispense code on the display, wherein the controller is to initiate dispensing a product based on the one or more product selections received from the server in response to receiving a code from the server that matches the dispense code presented on the display;
wherein the scannable device identifier comprises a QR code presented on the display of the dispensing device that is unique to the dispensing device;
wherein the QR code encodes a URL that is unique to the dispensing device; and
wherein the QR code encodes a URL that is based, at least in part, on a serial number of the dispensing device.

* * * * *